US011474742B2

(12) United States Patent
Joshi et al.

(10) Patent No.: US 11,474,742 B2
(45) Date of Patent: Oct. 18, 2022

(54) LOGGING OPERATIONS BASED ON MEMORY MAPPING IN A LOGGING SYSTEM

(71) Applicant: MICROSOFT TECHNOLOGY LICENSING, LLC, Redmond, WA (US)

(72) Inventors: Dhruv Joshi, Bellevue, WA (US); Chaitanya Gogineni, Redmond, WA (US); Vijay Mohan, Bellevue, WA (US); Suneetha Dhulipalla, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/917,625

(22) Filed: Jun. 30, 2020

(65) Prior Publication Data

US 2021/0405925 A1    Dec. 30, 2021

(51) Int. Cl.
G06F 3/06    (2006.01)

(52) U.S. Cl.
CPC .......... *G06F 3/0659* (2013.01); *G06F 3/0604* (2013.01); *G06F 3/0674* (2013.01)

(58) Field of Classification Search
None
See application file for complete search history.

(56) References Cited

U.S. PATENT DOCUMENTS 5,430,871 A     7/1995 Jamoussi et al.
7,606,812 B2    10/2009 Perrin et al.
(Continued)

FOREIGN PATENT DOCUMENTS

JP    2013025655 A    2/2013

OTHER PUBLICATIONS

"Configuring PuTTY", Retrieved from: https://web.archive.org/web/20180224162659/https://www.ssh.com/ssh/putty/putty-manuals/0.68/Chapter4.html, Feb. 24, 2018, 105 Pages.
(Continued)

*Primary Examiner* — Stephanie Wu
(74) *Attorney, Agent, or Firm* — NovoTechIP International PLLC

(57) ABSTRACT

Methods, systems, and computer storage media for providing log files using logging system operations in a logging system. The logging system operations support memory mapping log files and asynchronously managing file operations. The logging system operations support selectively mapping segments of log files during write operations. The logging operations also support performing file operations (e.g., closing, opening, deleting and serializing files) advantageously as background processes. Selective memory mapping specifically includes incrementally mapping new segments of a log file up to a predetermined log file size limit. The logging operations support processing spare files using spare file memory mapping. A spare file replaces an existing log file to continue writing logging data using the spare file. Based on the memory mapping, additional logging system operations of the logging system can be performed including persisting the log file data even when the application crashes, minimizing of forced flushes, and asynchronous file management.

20 Claims, 8 Drawing Sheets

(56) References Cited

U.S. PATENT DOCUMENTS

| | | | |
|---|---|---|---|
| 7,890,469 B1* | 2/2011 | Maionchi | G06F 16/10 |
| | | | 707/654 |
| 8,706,698 B2 | 4/2014 | Bachar et al. | |
| 9,529,809 B2 | 12/2016 | French et al. | |
| 2008/0294705 A1 | 11/2008 | Brauckhoff et al. | |
| 2013/0073532 A1* | 3/2013 | Bachar | G06F 16/10 |
| | | | 707/704 |
| 2016/0092464 A1* | 3/2016 | Hildebrand | G06F 16/1805 |
| | | | 707/648 |
| 2017/0109095 A1* | 4/2017 | Bauer | G06F 3/061 |
| 2018/0349410 A1* | 12/2018 | Zhang | G06F 16/1865 |

OTHER PUBLICATIONS

"Enterprise Manager Cloud Control Administrator's Guide", Retrieved from: https://web.archive.org/web/20170829174943/https:/docs.oracle.com/cd/E24628_01/doc.121/e24473/logging.htm, Aug. 29, 2017, 36 Pages.

"Managing Log Files and Diagnostic Data", Retrieved from: https://web.archive.org/web/20140107031805/https:/docs.oracle.com/cd/E29542_01/core.1111/e10105/logs.htm, Jan. 7, 2014, 55 Pages.

"Saving and Printing Output—Log Files", https://web.archive.org/web/20131126160252/https:/www.stata.com/manuals13/u15.pdf, Nov. 26, 2013, 6 Pages.

"Session Options/Terminal/Log File", Retrieved from: https://documentation.help/SecureCRT/SO_Terminal_Log_File.htm, Retrieved Date: May 11, 2020, 5 Pages.

Dhiman, et al., "DiagnosticLog CSP", Retrieved from: https://docs.microsoft.com/en-us/windows/client-management/mdm/diagnosticlog-csp, Nov. 19, 2019, 51 Pages.

Prithviraj, "DB2: Primary and Secondary logs and Troubleshooting", Retrieved from: https://blogs.sap.com/2015/12/31/db2-primary-and-secondary-logs-and-troubleshooting/, Dec. 31, 2015, 9 pages.

"International Search Report and Written Opinion Issued in PCT Application No. PCT/US2021/028732", dated Aug. 5, 2021, 12 Pages.

* cited by examiner

LOGGING OPERATIONS BASED ON MEMORY MAPPING IN A LOGGING SYSTEM

BACKGROUND

Users rely on logging systems for recording events that occur for different types of applications on client computing devices. A logging system, such as a transactional logging system, manages communications between a system and users of that system using log files. For example, a logging system keeps a log of communications or writes messages to a single log file. Conventional logging systems are limited in their ability to provide logging system operations in that logging of events that occur in applications is expensive in terms of performance which directly impacts computing resources of the computing environment of the applications (e.g., slowing down the applications) being logged and indirectly the computing environment (e.g., manual configuration of logging functionality). As logging systems continue to support logging applications on clients for users, improving logging system operations can result in more effective and efficient logging systems.

SUMMARY

Various aspects of the technology described herein are generally directed to systems, methods, and computer storage media, for among other things, for providing log files using logging system operations in a logging system. The logging system operations support memory mapping log files and asynchronously managing file operations. In particular, the logging system includes a logging system engine that processes logging computing objects (e.g., log files, segments of log files, existing spare log file, new spare log file, and memory) to implement the logging system operations. The logging system operations support selectively mapping segments of log files during write operations. The logging operations also support performing file operations (e.g., closing, opening, deleting and serializing files) as background processes. Selective memory mapping specifically includes incrementally or continuously mapping new segments of a log file up to a predetermined log file size limit. The logging operations further support processing spare files using spare file memory mapping. A spare file replaces an existing log file to continue writing logging data using the spare file. Based on the memory mapping, additional logging system operations of the logging system can be performed including persisting the log file data even when the application crashes, minimizing of forced flushes, and asynchronous file management.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION

Figure 1:
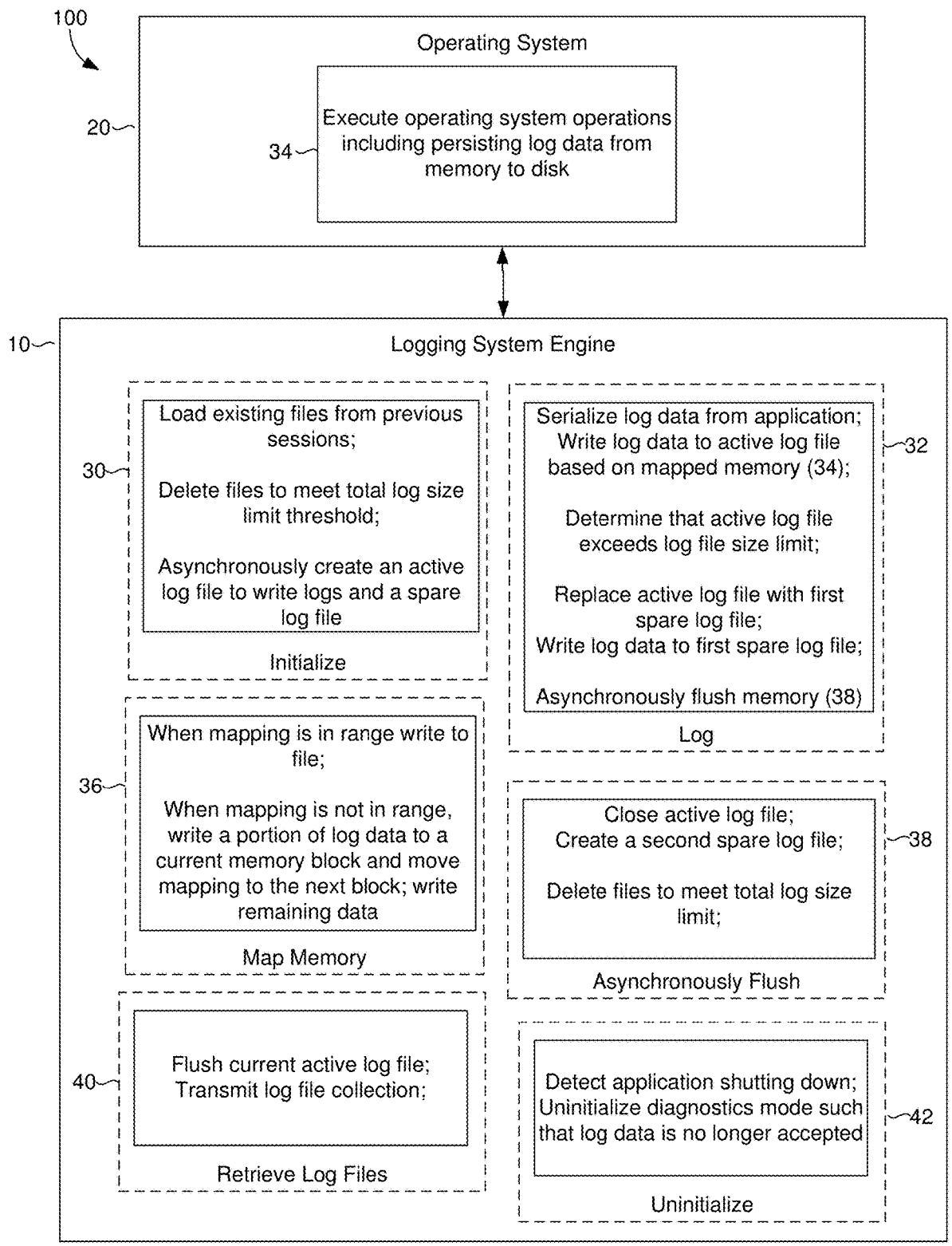
FIG. 1 is a block diagram of an exemplary logging system environment for providing logging operations based on memory mapping in a logging system, suitable for use in implementing aspects of the technology described herein.

Overview of Technical Problems, Technical Solutions, and Technological Improvements Logging systems or transactional logging systems can refer to recording events for managing communications between a system and users of that system using log files. Logging systems can provide a variety of functionality including keeping a log of communications or writes messages to log files. The logging system performs logging operations in association with clients and users of client applications (apps) on the clients. Apps can include software and services (e.g., word processor, spreadsheet, and presentation apps) that operate as productivity tools. Log data can be written to log files to ensure that application errors that are detected or reported can be analyzed. However, while the log data has to be continuously written to support troubleshooting and diagnosing problems, the apps generate significant amounts of log data (e.g., trace logging and telemetry events) for user sessions on apps.

Conventional logging systems are limited in their ability to provide logging system operations because logging of events that occur in applications is expensive (i.e., computing performance). Poor computing performance directly impacts computing resources of the applications (e.g., slowing down the applications) being logged and indirectly impacts the computing environment (e.g., manual configuration of logging functionality). Given that, practically, accessing disk memory for writing log files is much slower, any other operations being performed at the same time (e.g., using the same process thread) will experience lag or latency when the log files are being written.

Currently, several different shortcomings result from using a disk-writing approach in conventional logging systems. For example, a user performing an action on an application experiences a delay because logging operations are being performed for the application. Specifically, with size limits of individual log files, new files have to be created in order to start writing log data. Creating new log files causes delay in the execution of an application (e.g., freezing or hanging user interface). In addition, other negative impacts can be also be experienced whenever the collection of log files exceed the total log file collection size or when individual log files are being deleted. Moreover, application functionality can further be limited when logging operations performed on log files (e.g., opening, closing, deleting) are affected by other applications and services on the operating system (e.g., a virus application inspecting the log files while the application and the logging operations are running).

In another example, an administrator manually manages turning on logging or diagnostic functionality for an application. If the logging occurs continuously, the logging slows down the application. For example, after an issue has occurred with reference to an application, an administrator has to manually turn on logging and tries to recreate the issue. In addition, selectively turning logging on to diagnose a problem is not a suitable strategy because it is not always possible to recreate the issue in the way the issue occurred. If the logging system is operating at all times, this is better for troubleshooting strategy because events of the applications being logged. For example, if log files are persisted after a crashed application session, this can be helpful when diagnosing the reason for the crash for users of the application, especially customers in a distributed computing system. As such, a comprehensive logging system with an alternative basis for executing logging system operations can improve computing operations and interfaces in logging systems.

Embodiments of the present invention are directed to simple and efficient methods, systems, and computer storage media for providing log files using logging system operations in a logging system. The logging system operations support memory mapping log files and asynchronously managing file operations. In particular, the logging system includes a logging system engine that processes logging computing objects (e.g., log files, segments of log files, existing spare log file, new spare log file, and memory) to implement the logging system operations. The logging system operations support selectively mapping segments of log files during write operations. The logging operations also support performing file operations (e.g., closing, opening, deleting and serializing files) as background processes. Selective memory mapping specifically includes incrementally or continuously mapping new segments of a log file up to a predetermined log file size limit. The logging operations further support processing spare files using spare file memory mapping. A spare file replaces an existing log file to continue writing logging data using the spare file. Based on the memory mapping, additional logging system operations of the logging operations can be performed including persisting the log file data even when the application crashes, minimizing of forced flushes, and asynchronous file management.

Aspects of the technical solution can be described by way of examples and with reference to FIG. 1. FIG. 1 illustrates a logging system 100 having a logging system engine 10 and an operating system 20. The logging system 100 provides and performs improved logging system operations and interfaces to support the functionality of technical solution in a technical solution environment having components described herein with reference to FIG. 6, FIG. 7, and FIG. 8.

At a high level, a log-framework uses memory mapping for improved performance (e.g., speed) of logging operations and manages file operations (e.g., opening, closing, and deleting operations) to limit delays caused by the logging operations. Logging operations of the logging system can operate based Application Programming Interfaces (APIs) that are associated with an application. For example, a developer may want to design a new feature and as such, the developer may use the logging system engine and APIs to collect logging data for a specific application. The logging data can include application events or telemetry data that are captured for the application.

The logging operations can implement two different size limits or thresholds (i.e., a log file size limit and log file collection size limit). In this way, individual files and the collection of log files can be managed without impacting performance of the computing system and applications running during a user session. As such, the logging operations implements the size limits as a performance optimization for the logging system.

The logging operations address the limitations in conventional logging systems by implementing memory mapping for active log files and spare log files, minimizing forced flushes, and managing files asynchronously. With reference to memory mapping, instead of writing log data of the log file directly to disk, the log file (e.g., segments of the log file) is mapped to memory. In particular, log data is written based on segments of the log file that are incrementally or continuously mapped to memory. The segment of the file (e.g., a data chunk of the file) is mapped to memory and writes of log data are performed to that segment until the segment size and/or the file size are exceeded. With only individual segments of the file being mapped, memory allocation and memory management associated with the file is minimized, thus making logging operations faster. Moreover, logging operations can rely on the operating system for saving in-memory log data to disk, with the additional operating system optimizations that support persisting the log data of the log file to disk even when the application crashes.

It is contemplated that the log files can be serialized. Serializing the log file translates the file state to support memory mapping in segments as part of the logging operations. For example, bytes of a log file can be translated from an object to bytes and from bytes to an object again. Serialization can be in-memory serialization for the segment of the log file that is mapped to a memory mapping buffer. In-memory serialization can include directly serializing log data into a memory mapping buffer of a segment of the log file. In this regard the segmented memory mapped file approach is combined with in-memory serialization to further provide additional efficiencies and performance improvement.

With reference to managing file operations, the logging operations can be performed as background operations (e.g., background threads, asynchronous operations) such that file operations do not block any other process threads. For example, when an individual log file has met the file size limit, an active log file is switched with an existing spare file, and a new spare file is created asynchronously to avoid blocking additional threads. In this regard, delays in creating a new file during logging operations are eliminated. Specifically, the active log file is in real-time associated with a spare log file as a placeholder replacement file when the active log file meets the log file size limit. In addition, closing log files and deleting log files also occur as background operations; thus any interactions with other applications of the operating system occur in the background without impacting the application functionality.

At block 30, the logging system engine 10 supports initializing files (e.g., an active log file and a first spare log file) that are used to support logging operations for an application. Log files from previous sessions of the application are loaded. Initializing the files specifically includes creating an active log file for writing log data of the application. Initializing the files further includes creating a first spare log file that is used to replace the active log file during logging operations. It is contemplated that the active log file and the first spare log file are associated with a log file size limit. With a log file size limit, the log data stored using the active log file or the first spare log file does not exceed the log file size limit. Based on a threshold total size limit for log files, old log files can be deleted if it is determined that the threshold size limit has been exceeded. The active log file and the first spare log file can be asynchronously created in the using background threads to avoid interfering with application functionality.

At block 32, the logging system engine supports writing log data of an application to mapped memory of the active log file. Writing log data, for an application, can be performed when a configuration setting of the application is turned on to allow writing log data for the application. The log file can be serialized to support writing the log data based on segments of the log data file that are mapped into memory. The log data is written to the active log file. When writing the log data, a determination can be made that the log data is larger than a first mapped memory segment of the log file that is mapped to memory (e.g., the first mapped memory segment is mapped to a memory block). The logging operations support partial logging. With partial logging, a partial portion of the log data is first written to the available mapped memory, and then a second memory mapped segment of the log file is mapped to memory (e.g., a next memory block). As discussed fully in block 36, a determination can also be made that the active log file has or will exceed a log file size limit. If the log data cannot be saved to the active log file without exceeding the log file size limit, the logging operations include flushing operations to support writing the log data to the first spare log file.

At block 34, the operating system supports executing operating system operations for saving the log file (and log file data) to disk. Operating system operations can specifically support persisting the log file to disk even when the application crashes as part of the functionality of the operating system. At block 36, the logging system engine 10 supports memory mapping. Memory mapping supports writing log data to log files that are mapped to memory for eventual storage on disk. The logging system engine 10 interfaces with the operating system at block 34 such that log data that is written to an active log file (via memory mapping) is then stored on disk. The logging operations specifically support determining that the mapped memory is in range (i.e., an allocated memory block range or capacity) to write the log data and the specific size of the log data. When it is determined that the mapped memory is not in range (i.e., an allocated memory block range or capacity) and the size of the log data cannot be written to the mapped memory, a partial logging operation, as described above can be executed instead.

At block 38, the logging system engine supports asynchronous flushing of an active log file to improve performance of the application. The logging system engine 10 can execute forced flush operations at a minimal capacity. By way of context, a flush operation can refer to when data is written from a file from memory (e.g., mapped memory). An operating system associated with the logging system can support flush operations such that log data of the file is guaranteed to be saved to memory even with application crashes. In this regard, the logging system thus has to perform minimal or no forced flushes (i.e., manually triggered). The logging operations include asynchronously closing the active log file. The logging operations further include asynchronously creating a second spare log file. The second spare log file replaces the first spare log file that is operating as the active log file. It is contemplated that during an asynchronous flush operation, log files can be deleted from the system to meet a total log file size limit.

At step 40, the logging system engine 10 supports retrieving log files for performing diagnostic operations or performing review of events captured in the log files. The logging operations for retrieving log files include flushing an active log file and transmitting the log files (e.g., a log file collection). At step 42, the logging system engine 10 supports uninitializing the logging for the application. Uninitializing the logging stops logging operations of the logging system engine 10 such that log data is no longer written to the active log file. The logging operations for uninitializing logging include detecting that the application is shutting down and terminating processing of log data for the application.

Functionality of the embodiments of the present invention have further been described, by way of an implementation and anecdotal examples, to demonstrate that the operations for providing logging operations, based on memory mapping, are an unconventional ordered combination of operations that operate with a deployment engine as a solution to a specific problem in logging systems technology environments to improve computing operations and user interface navigation in logging systems. Advantageously, the embodiments described herein improve the computing operations, functionality, and the technological process for providing the functionality described herein. Overall, these improvements result in less CPU computation, smaller memory requirements, and increased flexibility in video management systems.

Figure 2:
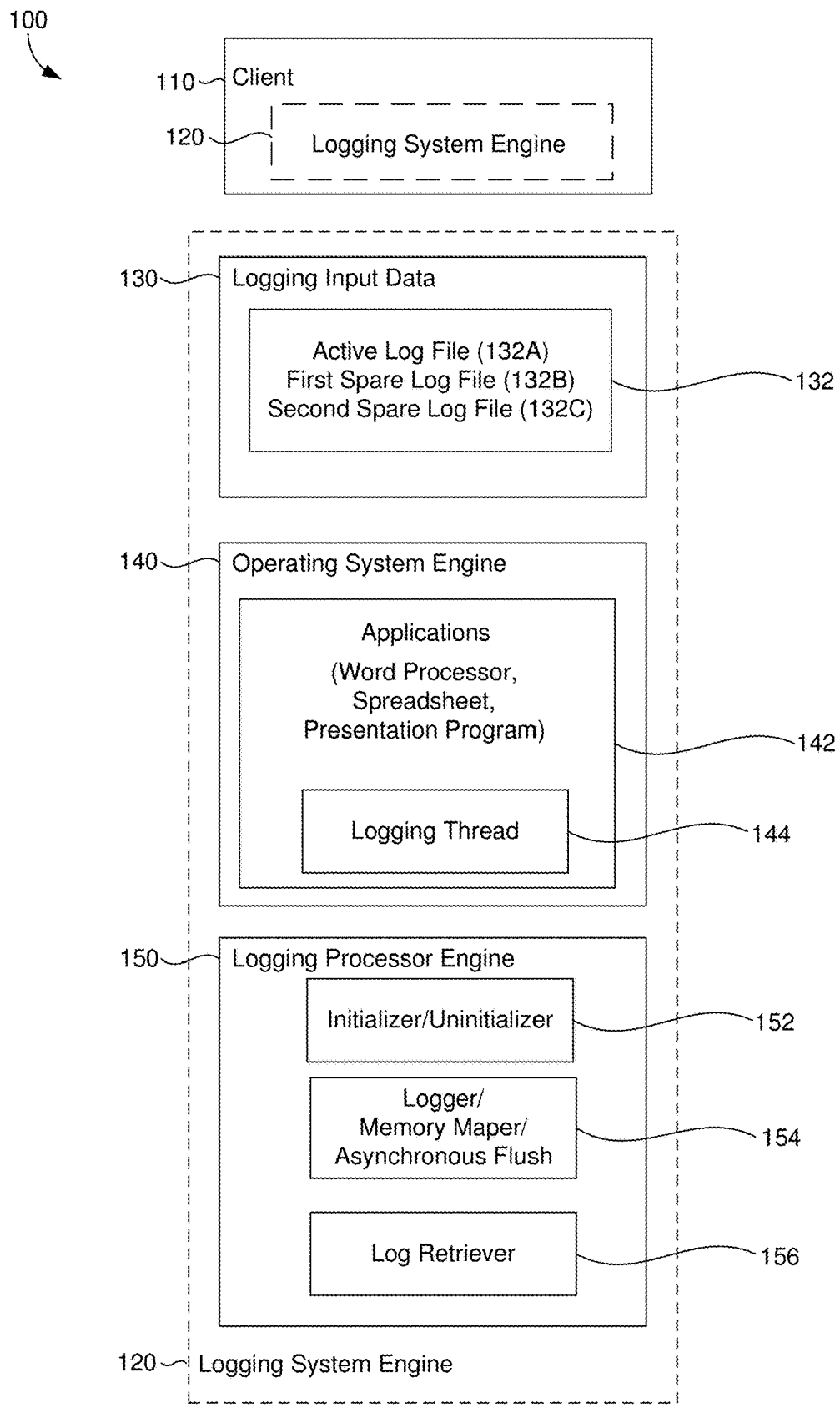
FIG. 2 is an exemplary logging system environment for providing logging operations based on memory mapping in a logging system, in accordance with aspects of the technology described herein.

Overview of Example Environments for Providing Logging Operations Based on Memory Mapping in a Logging System Turning to FIG. 2, a block diagram of an exemplary technical solution environment, based on example environments described with reference to FIGS. 6, 7 and 9, for use in implementing embodiments of the technical solution are shown. Generally the technical solution environment includes a technical solution system suitable for providing the example logging system 100 in which methods of the present disclosure may be employed. In particular, FIG. 2 shows a high level architecture of the logging system 100 in accordance with implementations of the present disclosure. Among other engines, managers, generators, selectors, or components not shown (collectively referred to herein as "components"), the technical solution environment of logging system 100 includes a client 110 and logging system engine 129. The logging system engine 120 includes logging input data 130 including log files 132 (active log file 132A, first spare log file 132B, and second spare log file 132C), operating system engine 140 including application 142 and main thread 144, and logging processor engine 150 including initializer/uninitializer 152, logger/Memory Mapper/ Asynchronous Flusher 154, and log retriever 156. The components of the logging system 100 can be providing log files using logging system operations of a log-file memory mapping framework in a logging system.

The logging system 100 provides logging system operations support memory mapping log files and asynchronously managing file operations. In particular, the logging system includes a logging system engine 120 that processes logging computing objects (e.g., log files, segments of log files, existing spare log file, new spare log file, and memory) to implement the logging system operations. The logging system operations support selectively mapping segments of log files during write operations. The logging operations also support performing file operations (e.g., closing, opening, deleting and serializing files) as background processes. Selective memory mapping specifically includes incrementally or continuously mapping new segments of a log file up to a predetermined log file size limit. The logging operations further support processing spare files using spare file memory mapping. A spare file replaces an existing log file to continue writing logging data using the spare file. Based on the memory mapping, additional logging system operations of the logging system can be performed including persisting the log file data even when the application crashes, minimizing of forced flushes, and asynchronous file management.

Figure 3:
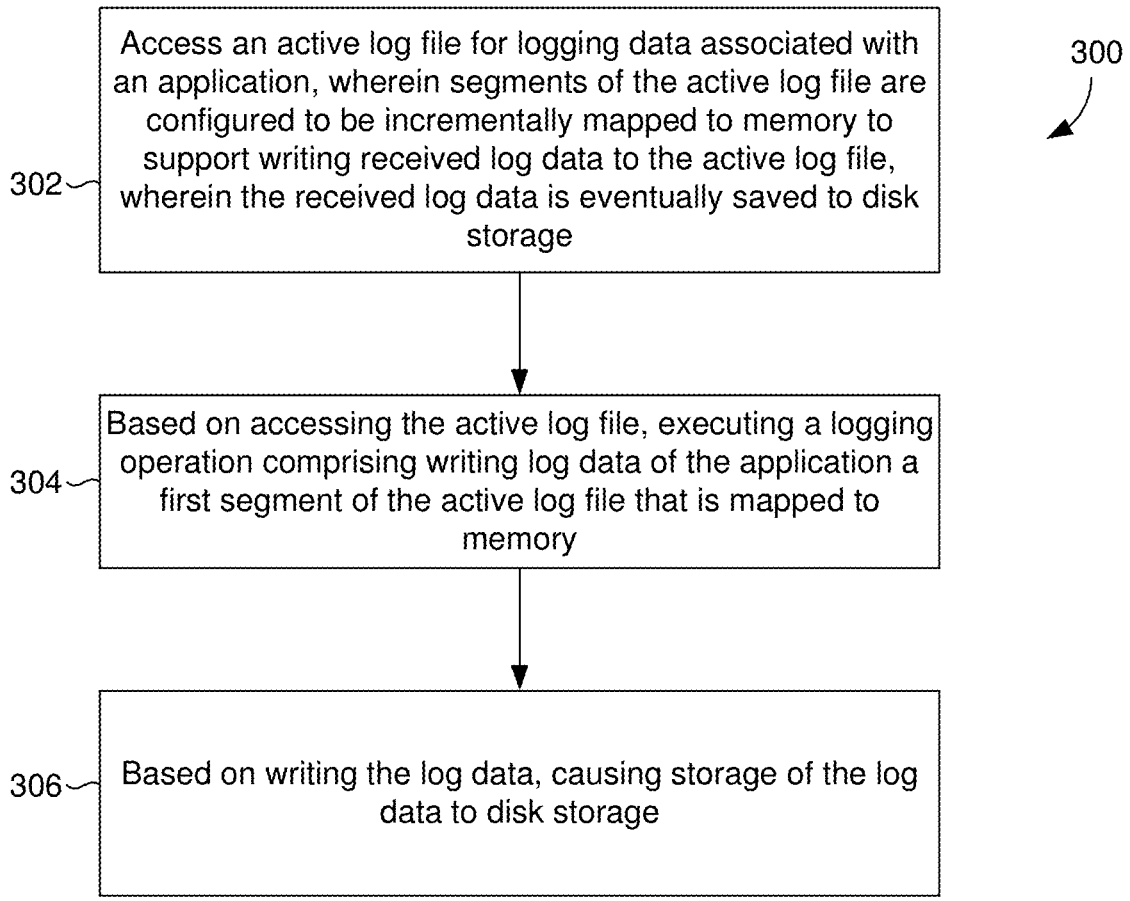
FIG. 3 provides a first exemplary method of providing logging operations based on memory mapping in a logging system in accordance with aspects of the technology described herein.
Figure 4:
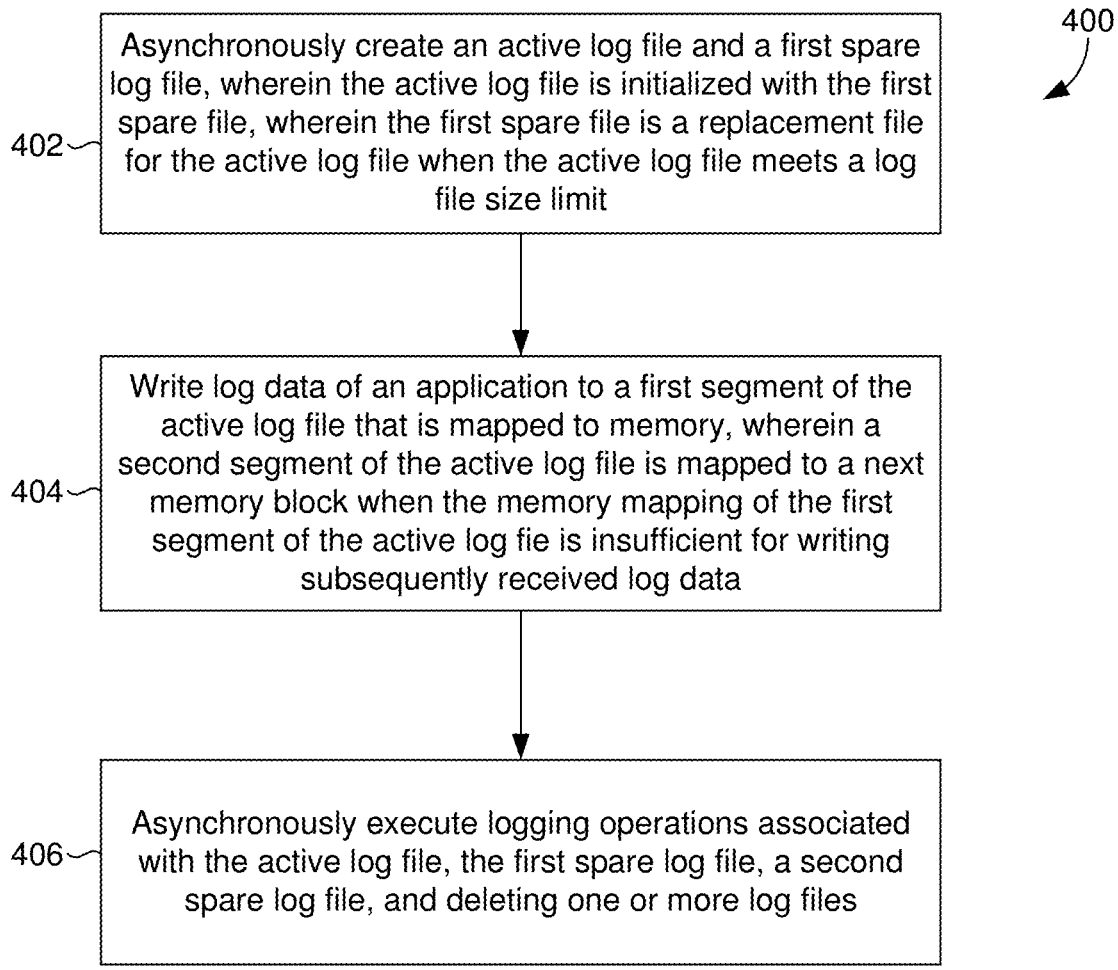
FIG. 4 provides a second exemplary method of providing logging operations based on memory mapping in a logging system, in accordance with aspects of the technology described herein.
Figure 5:
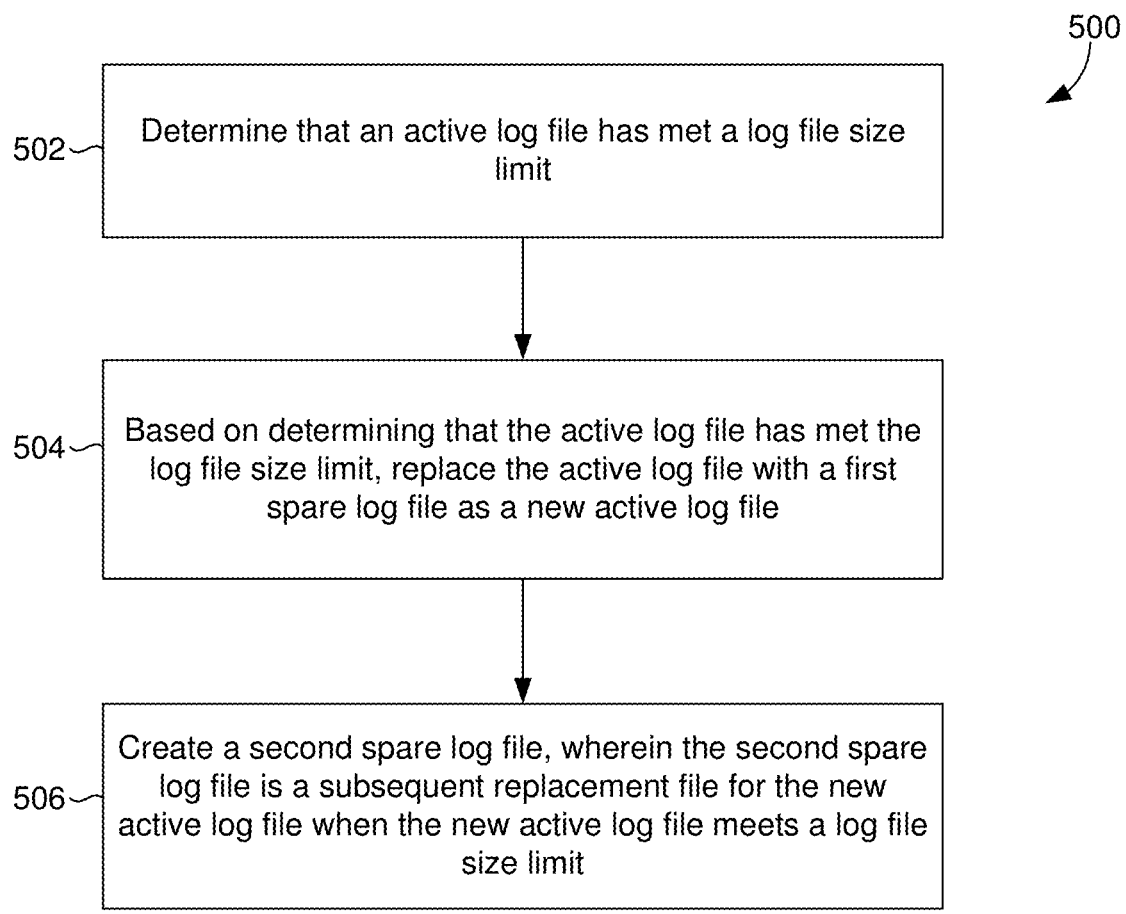
FIG. 5 provides a third exemplary method of providing logging operations based on memory mapping in a logging system, in accordance with aspects of the technology described herein.

Exemplary Methods for Providing Logging Operations Based on Memory Mapping in a Logging System With reference to FIGS. 3, 4 and 5, flow diagrams are provided illustrating methods for logging operations based on memory mapping in a logging system. The methods may be performed using the search system described herein. In embodiments, one or more computer storage media having computer-executable instructions embodied thereon that, when executed, by one or more processors can cause the one or more processors to perform the methods in the file system.

Turning to FIG. 3, a flow diagram is provided that illustrates a method 300 for providing logging operations based on memory mapping in a logging system. At block 302, access an active log file for logging data associated with an application. The segments of the active log file are configured to be incrementally mapped to memory to support writing received log data to the active log file. Incrementally mapping the active log file includes mapping a second segment of the active log file to a next memory block when a memory mapping of the first segment of the active log file is insufficient for writing subsequently received log data. The log data is eventually saved to disk storage. The active log file is initialized with a first spare file. The first spare file is a replacement file for the active log file when the active log file meets a log file size limit.

At block 304, based on accessing the active log file, execute a logging operation comprising writing log data of the application a first segment of the active log file that is mapped to memory. Logging operations can be asynchronously executed with the active log file, a first spare log file, a second spare log file, and deleting one or more log files to not exceed a total log file size limit. At block 306, based on writing the log data, cause storage of the log data to disk storage.

Turning to FIG. 4, a flow diagram is provided that illustrates a method 400 for providing logging operations based on memory mapping in a logging system. At block 402, asynchronously create an active log file and a first spare log file. The active log file is initialized with the first spare file. The first spare file is a replacement file for the active log file when the active log file meets a log file size limit. At block 404, write log data of an application to a first segment of the active log file that is mapped to memory. A second segment of the active log file is mapped to a next memory block when the memory mapping of the first segment of the active log fie is insufficient for writing subsequently received log data. At block 406, Asynchronously execute logging operations associated with the active log file, the first spare log file, a second spare log file, and deleting one or more log files.

Turning to FIG. 5, a flow diagram is provided that illustrates a method 500 providing logging operations based on memory mapping in a logging system. At block 502, determine that an active log file has met a log file size limit. At block 504, based on determining that the active log file has met the log file size limit, replace the active log file with a first spare log file as a new active log file. At block 506, create a second spare log file. The second spare log file is a subsequent replacement file for the new active log file when the new active log file meets a log file size limit.

Example System Environment

Figure 6:
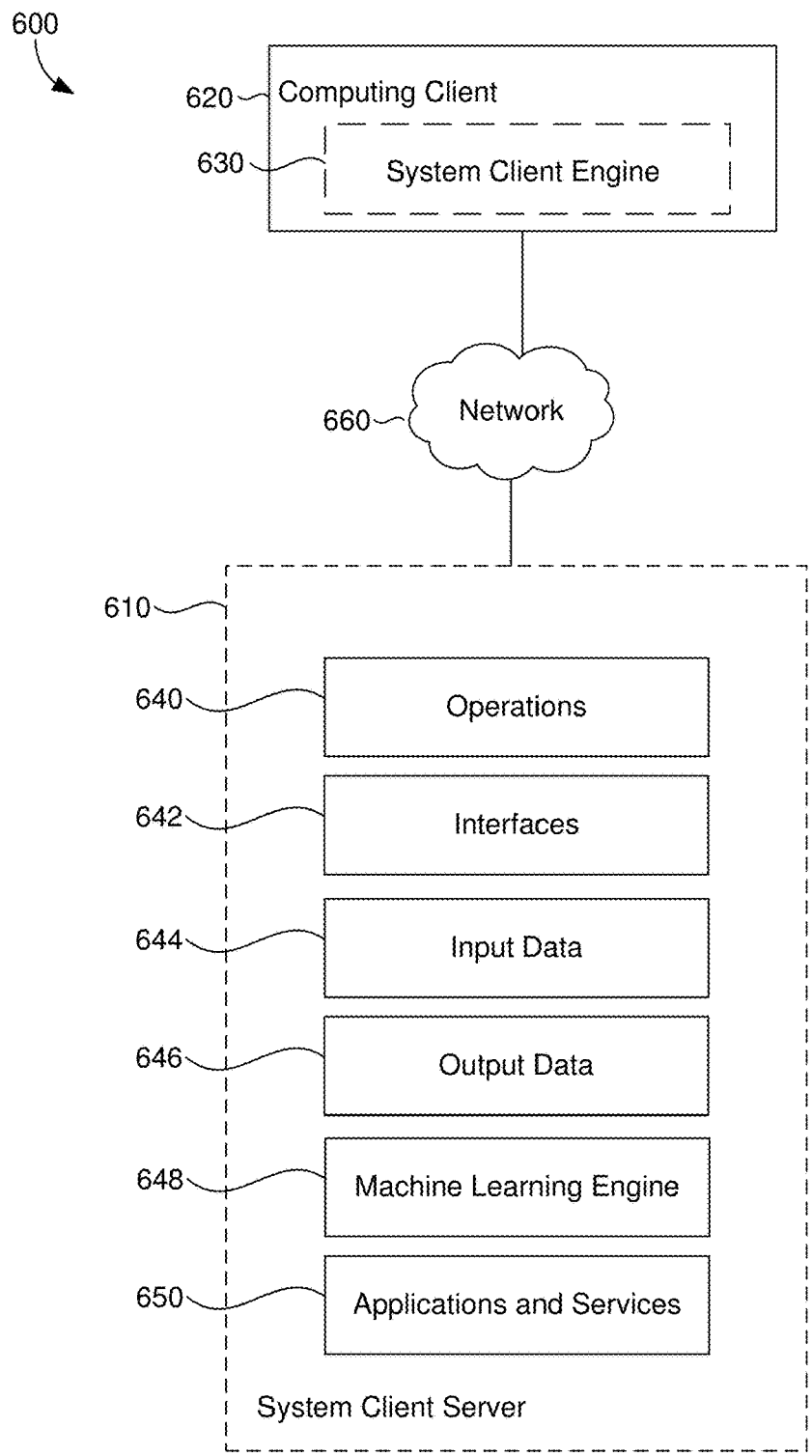
FIG. 6 provides a block diagram of an exemplary system environment suitable for use in implementing aspects of the technology described herein.

With reference to FIG. 6, FIG. 6 illustrates an example system environment 600 in which implementations of the technical solution may be employed. In particular, FIG. 6 illustrates a client-server environment that includes system client server 610 and computing client 620 having a system client engine that can mirror components in the system client server 610. The system client server includes operations 640, interfaces 642, input data 644, output data 646, machine learning engine 648, and application and service 650 that are part of a technical solution environment to support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an API library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

The technical solution system can further include a machine learning system. A machine-learning system may include machine-learning tools and training components. Machine-learning systems can include machine-learning tools that are utilized to perform operations in different types of technology fields. Machine-learning systems can include pre-trained machine-learning tools that can further be trained for a particular task or technological field. At a high level, machine-learning is a field of study that gives computers the ability to learn without being explicitly programmed. Machine-learning explores the study and construction of machine-learning tools, including machine-learning algorithm or models, which may learn from existing data and make predictions about new data. Such machine-learning tools operate by building a model from example training data in order to make data-driven predictions or decisions expressed as outputs or assessments. Although example embodiments are presented with respect to a few machine-learning tools, the principles presented herein may be applied to other machine-learning tools. It is contemplated that different machine-learning tools may be used, for example, Logistic Regression (LR), Naive-Bayes, Random Forest (RF), neural networks (NN), matrix factorization, and Support Vector Machines (SVM) tools may be used for addressing problems in different technological fields.

In general, there are two types of problems in machine-learning: classification problems and regression problems. Classification problems, also referred to as categorization problems, aim at classifying items into one of several category values (for example, is this email SPAM or not SPAM). Regression algorithms aim at quantifying some items (for example, by providing a value that is a real number). Machine-learning algorithms can provide a score (e.g., a number from 1 to 100) to qualify one or more products as a match for a user of the online marketplace. It is contemplated that cluster analysis or clustering can be performed as part of classification, where clustering refers to the task of grouping a set of objects in such a way that objects in the same group (called a cluster) are more similar (in some sense) to each other than to those in other groups (clusters). It is a main task of exploratory data mining, and a common technique for statistical data analysis, used in many fields, including pattern recognition, image analysis, information retrieval, bioinformatics, data compression, computer graphics and machine learning.

Machine-learning algorithms utilize the training data to find correlations among identified features (or combinations of features) that affect an outcome. A trained machine-learning model may be implemented to perform a machine-learning operation based on a combinations of features. An administrator of a machine-learning system may also determine which of the various combinations of features are relevant (e.g., lead to desired results), and which ones are not. The combinations of features determined to be (e.g., classified as) successful are input into a machine-learning algorithm for the machine-learning algorithm to learn which combinations of features (also referred to as "patterns") are "relevant" and which patterns are "irrelevant." The machine-learning algorithms utilize features for analyzing the data to generate an output or an assessment. A feature can be an individual measurable property of a phenomenon being observed. The concept of feature is related to that of an explanatory variable used in statistical techniques such as linear regression. Choosing informative, discriminating, and independent features is important for effective operation of the machine-learning system in pattern recognition, classification, and regression. Features may be of different types, such as numeric, strings, and graphs.

The machine-learning algorithms utilize the training data to find correlations among the identified features that affect the outcome or assessment. The training data includes known data for one or more identified features and one or more outcomes. With the training data and the identified features the machine-learning tool is trained. The machine-learning tool determines the relevance of the features as they correlate to the training data. The result of the training is the trained machine-learning model. When the machine-learning model is used to perform an assessment, new data is provided as an input to the trained machine-learning model, and the machine-learning model generates the assessment as output.

Example Distributed Computing System Environment

Figure 7:
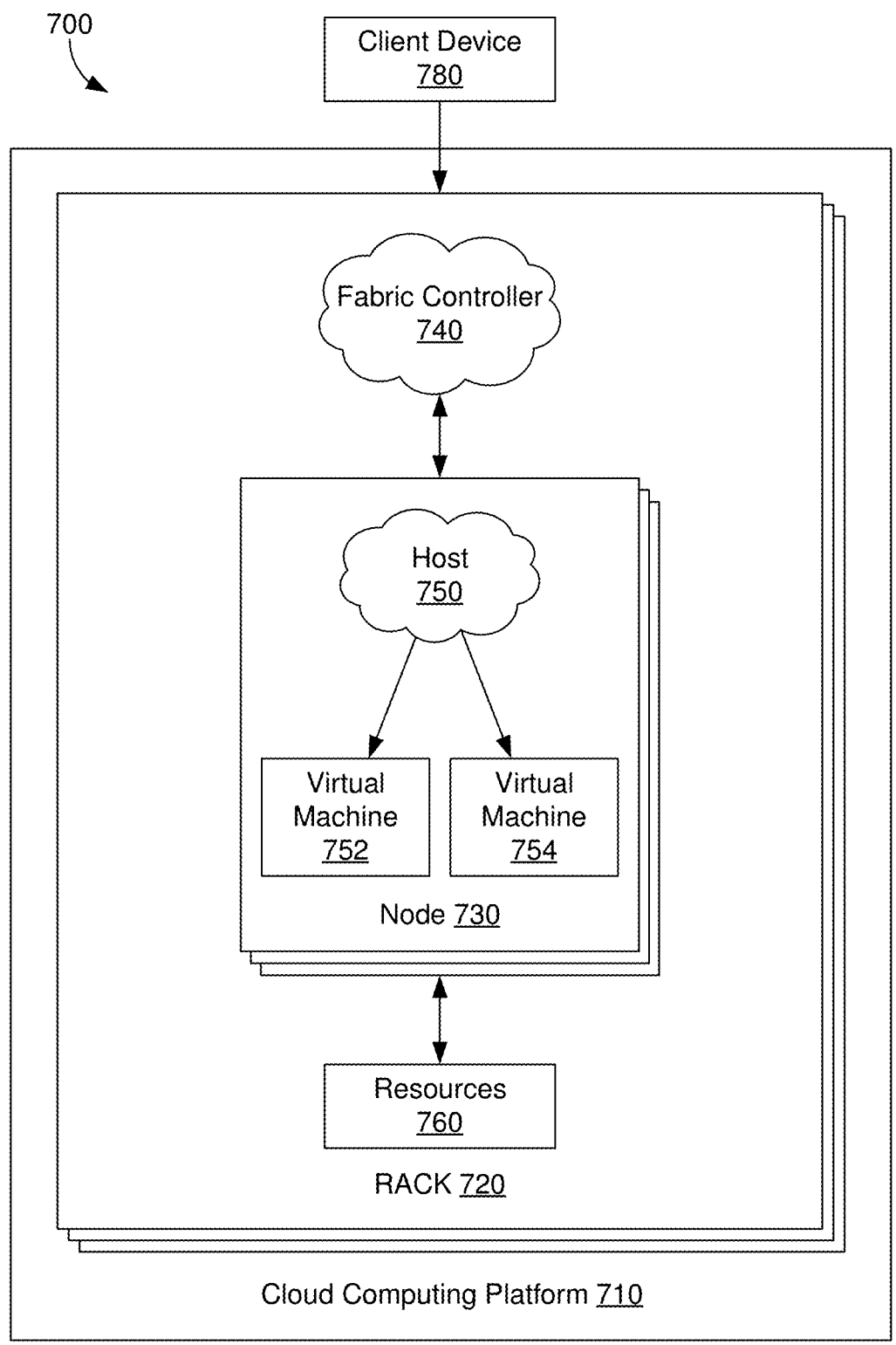
FIG. 7 provides a block diagram of an exemplary distributed computing environment suitable for use in implementing aspects of the technology described herein.

Referring now to FIG. 7, FIG. 7 illustrates an example distributed computing environment 700 in which implementations of the present disclosure may be employed. In particular, FIG. 7 shows a high level architecture of an example cloud computing platform 710 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 700 that includes cloud computing platform 710, rack 720, and node 730 (e.g., computing devices, processing units, or blades) in rack 720. The technical solution environment can be implemented with cloud computing platform 710 that runs cloud services across different data centers and geographic regions. Cloud computing platform 710 can implement fabric controller 740 component for provisioning and managing resource allocation, deployment, upgrade, and management of cloud services. Typically, cloud computing platform 710 acts to store data or run service applications in a distributed manner. Cloud computing infrastructure 710 in a data center can be configured to host and support operation of endpoints of a particular service application. Cloud computing infrastructure 710 may be a public cloud, a private cloud, or a dedicated cloud.

Node 730 can be provisioned with host 750 (e.g., operating system or runtime environment) running a defined software stack on node 730. Node 730 can also be configured to perform specialized functionality (e.g., compute nodes or storage nodes) within cloud computing platform 710. Node 730 is allocated to run one or more portions of a service application of a tenant. A tenant can refer to a customer utilizing resources of cloud computing platform 710. Service application components of cloud computing platform 710 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 730, nodes 730 may be partitioned into virtual machines (e.g., virtual machine 752 and virtual machine 754). Physical machines can also concurrently run separate service applications. The virtual machines or physical machines can be configured as individualized computing environments that are supported by resources 760 (e.g., hardware resources and software resources) in cloud computing platform 710. It is contemplated that resources can be configured for specific service applications. Further, each service application may be divided into functional portions such that each functional portion is able to run on a separate virtual machine. In cloud computing platform 710, multiple servers may be used to run service applications and perform data storage operations in a cluster. In particular, the servers may perform data operations independently but exposed as a single device referred to as a cluster. Each server in the cluster can be implemented as a node.

Client device 780 may be linked to a service application in cloud computing platform 710. Client device 780 may be any type of computing device, which may correspond to computing device 700 described with reference to FIG. 7, for example, client device 780 can be configured to issue commands to cloud computing platform 710. In embodiments, client device 780 may communicate with service applications through a virtual Internet Protocol (IP) and load balancer or other means that direct communication requests to designated endpoints in cloud computing platform 710. The components of cloud computing platform 710 may communicate with each other over a network (not shown), which may include, without limitation, one or more local area networks (LANs) and/or wide area networks (WANs).

Example Computing Environment

Figure 8:
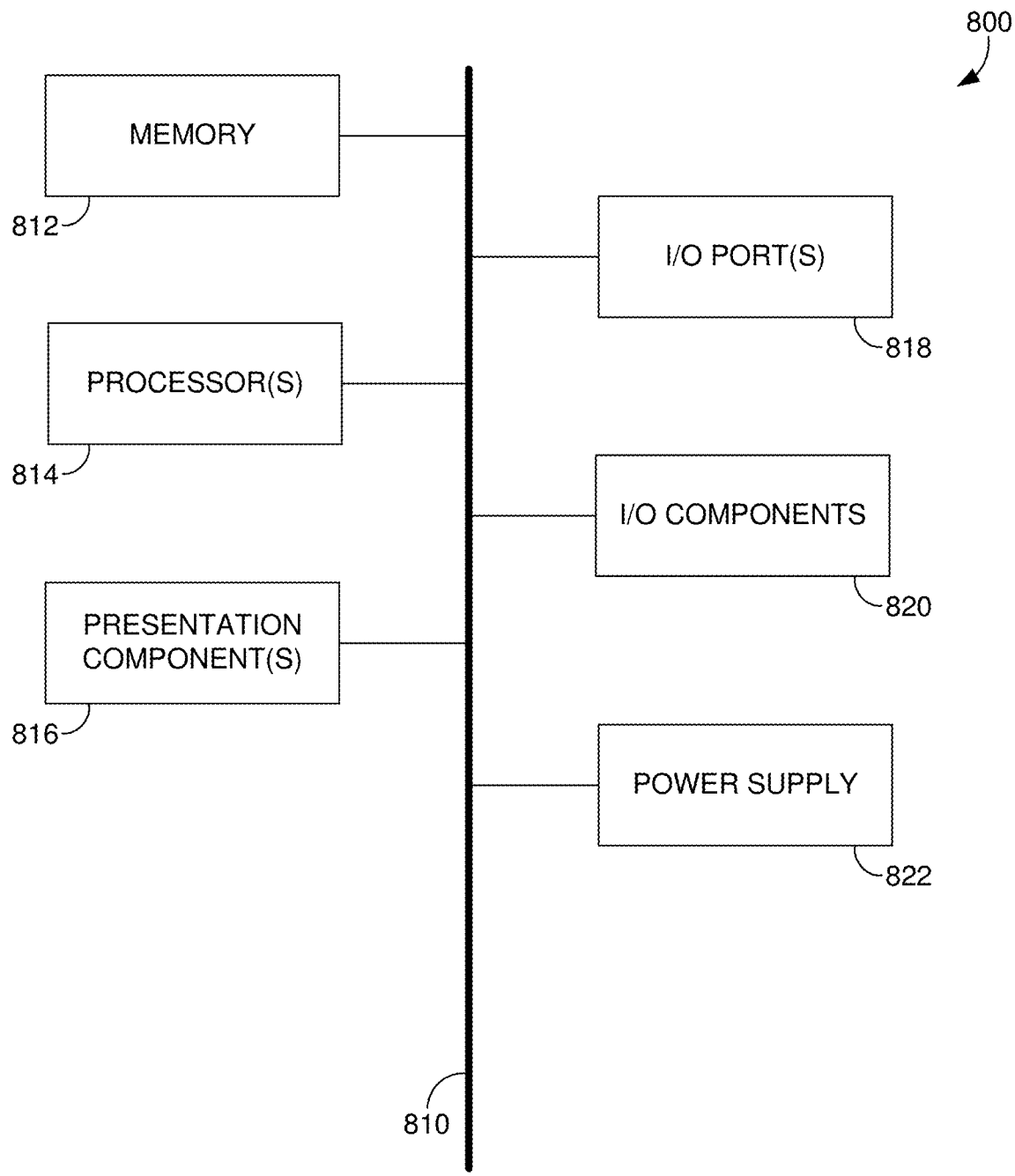
FIG. 8 is a block diagram of an exemplary computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 8 in particular, an example operating environment for implementing embodiments of the present invention is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output ports 818, input/output components 820, and illustrative power supply 822. Bus 810 represents what may be one or more buses (such as an address bus, data bus, or combination thereof). The various blocks of FIG. 8 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 8 is merely illustrative of an example computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:
one or more computer processors; and
computer memory storing computer-useable instructions that, when used by the one or more computer processors, cause the one or more computer processors to perform operations comprising:
performing an initializing operation comprising creating an active log file configured for writing log data of an application during a logging operation and creating a first spare log file configured to replace the active log file during the logging operation when the active log file meets a log file size limit, wherein the active log file and the first spare log file are asynchronously created from other functions of the application using background threads to avoid interfering with the other functions of the application;
accessing the active log file for logging data associated with the application, where segments of the active log file are configured to be incrementally mapped to memory to support writing received log data to the active log file,
based on accessing the active log file, executing the logging operation comprising writing log data of the application to a first segment of the active log file that is mapped to memory; and
based on writing the log data, causing storage of the log data to disk storage.

2. The system of claim 1, wherein the computer memory storing computer-useable instructions cause the one or more computer processors to perform operations, during the initializing of the application and prior to creating the active log file and the first spare log file, of loading existing files from previous sessions and deleting files to meet a total log size limit threshold.

3. The system of claim 2, wherein the active log file is associated in real-time with the first spare log file.

4. The system of claim 1, wherein incrementally mapping the active log file comprises mapping a second segment of the active log file to a next memory block when a memory mapping of the first segment of the active log file is insufficient for writing subsequently received log data.

5. The system of claim 1, the operations further comprising asynchronously executing logging operations associated with the active log file, the first spare log file, a second spare log file, and deleting one or more log files to not exceed a total log file size limit.

6. The system of claim 1, the operations further comprising,
determining that the active log file has met a log file size limit;
based on determining that the active log file has met the log file size limit, replacing the active log file with the first spare log file; and
creating a second spare log file.

7. The system of claim 1, the operations further comprising, receiving a request to transmit a log file collection, based on receiving the request to transmit the log file collection, flushing the active log file; and transmitting the log file collection comprising the active log file.

8. One or more computer-storage media having computer-executable instructions embodied thereon that, when executed by a computing system having a processor and memory, cause the processor to:

perform an initializing operation comprising creating an active log file configured for writing log data of an application during a logging operation and creating a first spare log file configured to replace the active log file during the logging operation when the active log file meets a log file size limit, wherein the active log file and the first spare log file are asynchronously created from other functions of the application using background threads to avoid interfering with the other functions of the application;

access the active log file for logging data associated with the application, where segments of the active log file are configured to be incrementally mapped to memory to support writing received log data to the active log file;

based on accessing the active log file, execute the logging operation comprising writing log data of the application to a first segment of the active log file that is mapped to memory; and based on writing the log data, cause storage of the log data to disk storage.

9. The media of claim 8, wherein the computer-executable instructions cause the computing system to perform operations, during the initializing of the application and prior to creating the active log file and the first spare log file, of loading existing files from previous sessions and deleting files to meet a total log size limit threshold.

10. The media of claim 9, wherein the active log file is associated in real-time with the first spare log file.

11. The media of claim 8, wherein incrementally mapping the active log file comprises mapping a second segment of the active log file to a next memory block when a memory mapping of the first segment of the active log file is insufficient for writing subsequently received log data.

12. The media of claim 8, the operations further comprising asynchronously executing logging operations associated with the active log file, the first spare log file, a second spare log file, and deleting one or more log files to not exceed a total log file size limit.

13. The media of claim 8, the operations further comprising,
determining that the active log file has met a log file size limit;
based on determining that the active log file has met the log file size limit, replacing the active log file with the first spare log file; and
creating a second spare log file.

14. The media of claim 8, the operations further comprising, receiving a request to transmit a log file collection, based on receiving the request to transmit the log file collection, flushing the active log file; and transmitting the log file collection comprising the active log file.

15. A computer-implemented method, the method comprising:
performing an initializing operation comprising creating an active log file configured for writing log data of an application during a logging operation and creating a first spare log file configured to replace the active log file during the logging operation when the active log file meets a log file size limit, wherein the active log file and the first spare log file are asynchronously created from other functions of the application using background threads to avoid interfering with the other functions of the application;
accessing the active log file for logging data associated with the application, where segments of the active log file are configured to be incrementally mapped to memory to support writing received log data to the active log file;
based on accessing the active log file, executing the logging operation comprising writing log data of the application to a first segment of the active log file that is mapped to memory; and
based on writing the log data, causing storage of the log data to disk storage.

16. The method of claim 15, wherein the method further comprises, during the initializing of the application and prior to creating the active log file and the first spare log file, loading existing files from previous sessions and deleting files to meet a total log size limit threshold.

17. The method of claim 15, wherein the active log file is associated in real-time with the first spare log file.

18. The method of claim 15, wherein incrementally mapping the active log file comprises mapping a second segment of the active log file to a next memory block when a memory mapping of the first segment of the active log file is insufficient for writing subsequently received log data.

19. The method of claim 15, the operations further comprising asynchronously executing logging operations associated with the active log file, the first spare log file, a second spare log file, and deleting one or more log files to not exceed a total log file size limit.

20. The method of claim 15, the operations further comprising,
determining that the active log file has met a log file size limit;
based on determining that the active log file has met the log file size limit, replacing the active log file with the first spare log file; and
creating a second spare log file.

* * * * *